Oct. 10, 1933.  H. A. GREENWALD ET AL  1,929,491
SHAFT AND SEAL ASSEMBLY
Filed Aug. 11, 1930
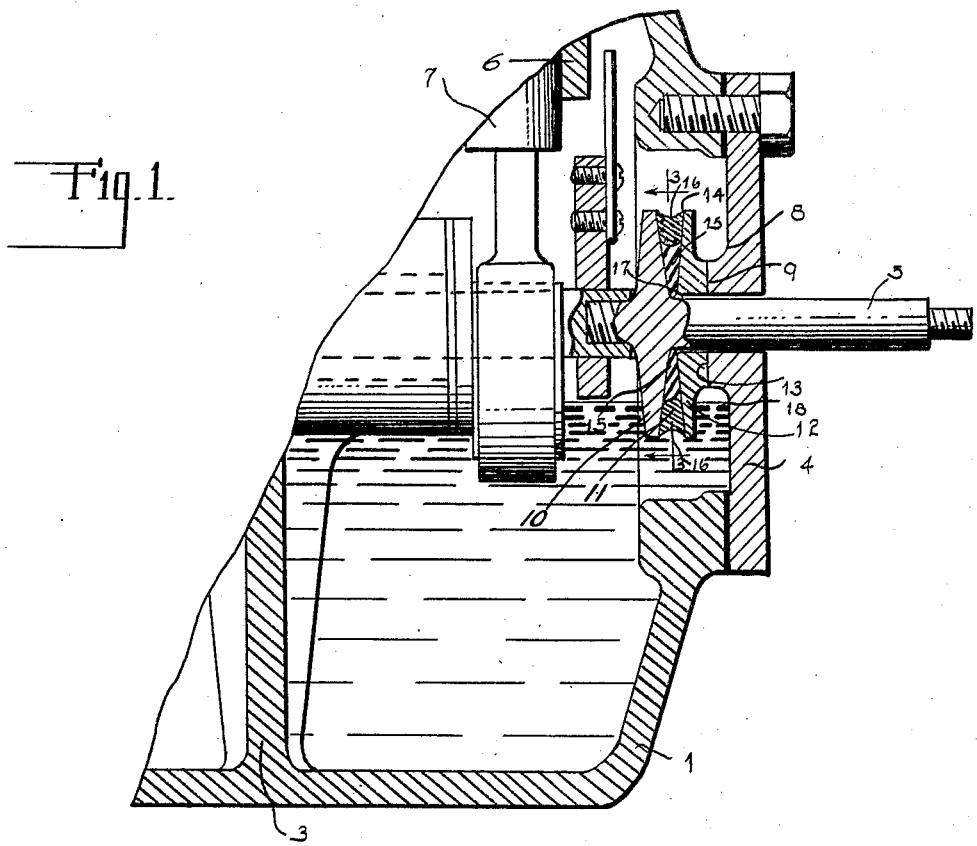
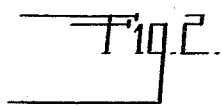
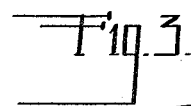
INVENTOR
Harold A. Greenwald
William D. Drysdale
BY
ATTORNEYS Patented Oct. 10, 1933

1,929,491

UNITED STATES PATENT OFFICE 1,929,491

SHAFT AND SEAL ASSEMBLY

Harold A. Greenwald and William D. Drysdale, Detroit, Mich., assignors, by mesne assignments, to Kelvinator Corporation, Detroit, Mich., a corporation of Michigan Application August 11, 1930. Serial No. 474,574

2 Claims. (Cl. 286—7)

This invention relates generally to seal constructions, especially to those designed for use in connection with the rotating shafts of refrigerating apparatus, and consists of certain novel features of construction, combinations and arrangements of parts, that will be hereinafter more fully described and particularly pointed out in the appended claims.

In the accompanying drawing:

Figure 1 is a vertical sectional view through a refrigerating apparatus with a seal embodying our invention applied thereto;

Figure 2 is a sectional view on an enlarged scale showing a detail of the sealing members shown in Figure 1;

Figure 3 is a sectional view taken on the line 3—3 of Figure 1.

Referring now to the drawing, 1 is a casing having an opening 2 at one end and provided intermediate its ends with a substantially vertical partition 3; 4 is a cover plate or closure for the opening 2; 5 is a rotating shaft journaled in the partition 3 and cover plate 4; and 6 is a refrigerant compressor in the casing and having a piston 7 operatively connected to and adapted to be driven by the shaft 5.

Preferably the cover plate 4 is provided about the shaft 5 with an annular inwardly extending boss or flange 8 that is provided at its inner end with a flat seal face 9, while the shaft 5 is provided adjacent said cover plate 4 with an annular flange 10 having a conical face 11. Sleeved freely upon the shaft 5 is a sealing ring 12 that is provided on one side with a flat seal face 13 for sealing engagement with the seal face 9 of the boss, and is provided on its opposite side with a conical face 14 that is opposed to the conical face 11 of the flange 10 on the shaft. Located between and engaging the opposed conical faces 11 and 14 are concentric rings 15 and 16 respectively of rubber and cork that are actuable as a unit by pressure in the casing 1 and function as a wedge. In use, the pressure in the casing 1 acts upon the periphery of the outermost ring 16 and causes both rings 16 and 15 to be compressed towards the shaft 5. This causes the crack or space 17 between the ring 12 and shaft 5 to be effectively closed and sealed, and causes the ring 12 to be moved longitudinally of the shaft 5 toward the cover plate 4 so that the seal face 13 of the ring will have proper sealing engagement with the seal face 9 of the boss on the plate. Thus the refrigerant gas and oil in the casing 1 is prevented from escaping along the shaft 5 through the cover plate 4 to the atmosphere. When the liquid or gas in the casing 1 is not deleterious to rubber, it would be advisable to use rubber alone for the wedge, but when oil is used, as in the present instance, (18 designatees the normal oil level) then it is advisable to use cork alone or cork on the outside of the rubber to prevent the oil from coming in contact with the rubber. In either case whether formed of rubber alone, cork alone, or the combination of rubber and cork, the wedge has a considerably greater co-efficient of friction against the members 10 and 12 than the member 12 has against the member 8 so that when the shaft 5 rotates, the rings 15, 16 and 12 rotate in unison therewith.

Thus from the foregoing it will be readily apparent that the expansible bellows commonly used in seal constructions have been eliminated and the cost of manufacturing such constructions has been materially reduced.

What we claim as our invention is:

1. In combination, a crank casing, a drive shaft extending therethrough, a sealing surface formed integrally with the casing around the shaft, a sealing ring loosely mounted on the shaft for cooperating with the aforementioned sealing surface, a flange member rigidly attached to the shaft beyond the sealing ring, means preventing a fluid passing between the flange member and the sealing ring longitudinally of the shaft comprising two circular resilient members closing the space between the flange member and the sealing ring and actuable radially by external pressure so that opposite sides of said members will constantly press against and maintain sealing engagement with said flange member and sealing ring, one of said members serving as a protective coating for the other member.

2. In combination, a crank casing, a drive shaft extending therethrough, a sealing surface formed integrally with the casing around the shaft, a sealing ring loosely mounted on the shaft for cooperating with the aforementioned sealing surface, a flange member rigidly attached to the shaft beyond the sealing ring, means preventing a fluid passing between the flange member and the sealing ring longitudinally of the shaft comprising an inherently resilient circular member closing the space between the flange member and the sealing ring and actuable radially by external pressure so that opposite sides of said member will constantly press against and maintain sealing engagement with said sealing ring, and a second member disposed circumferentially about the resilient member to serve as a protective coating for said member.

HAROLD A. GREENWALD.
WILLIAM D. DRYSDALE.